US009273873B1

(12) United States Patent
Ohunna, II

(10) Patent No.: US 9,273,873 B1
(45) Date of Patent: Mar. 1, 2016

(54) HOLLOW DRAFT INDUCERS (DRAFT INDUCERS OR HOLLOW INDUCERS)

(71) Applicant: Paul N. Ohunna, II, Dayton, OH (US)

(72) Inventor: Paul N. Ohunna, II, Dayton, OH (US)

(73) Assignee: Home Energy Technologies, Inc., Dayton, OH (US)

( * ) Notice: Subject to any disclaimer, the term of this patent is extended or adjusted under 35 U.S.C. 154(b) by 34 days.

(21) Appl. No.: 13/872,100

(22) Filed: Apr. 27, 2013

Related U.S. Application Data

(60) Provisional application No. 61/665,847, filed on Jun. 28, 2012.

(51) Int. Cl.
| | |
|---|---|
| *F24D 19/10* | (2006.01) |
| *F23J 11/00* | (2006.01) |
| *F24H 3/02* | (2006.01) |
| *F24H 8/00* | (2006.01) |
| *F04D 17/16* | (2006.01) |
| *F23L 17/00* | (2006.01) |
| *F04D 13/02* | (2006.01) |
| *F04D 25/02* | (2006.01) |

(52) U.S. Cl.
CPC .......... *F24D 19/1084* (2013.01); *F04D 13/028* (2013.01); *F04D 17/165* (2013.01); *F04D 25/028* (2013.01); *F23J 11/00* (2013.01); *F23L 17/005* (2013.01); *F24H 3/027* (2013.01); *F24H 8/00* (2013.01)

(58) Field of Classification Search
CPC ...... F23L 17/005; F23L 13/02; F04D 25/028; F04D 17/165; F04D 13/028

USPC ................. 417/423.6, 423.1, 423.14, 423.12, 417/423.15, 424.1, 355, 362, 365; 110/162, 110/163; 415/122.1, 140, 141, 220; 126/312, 304; 454/8, 9, 15–21
See application file for complete search history.

(56) References Cited

U.S. PATENT DOCUMENTS

| | | | |
|---|---|---|---|
| 1,151,611 | A | 8/1915 | Prat |
| 3,431,056 | A | 3/1969 | Winegardner |
| 3,782,303 | A | 1/1974 | Pfister et al. |
| 4,250,868 | A | 2/1981 | Frye |
| 4,649,808 | A | 3/1987 | Ward et al. |
| 5,609,522 | A | 3/1997 | Szwartz |
| 6,182,654 | B1 * | 2/2001 | Jones ............................ 126/312 |
| 6,394,766 | B1 * | 5/2002 | Gill et al. ................... 417/423.1 |
| 7,210,903 | B2 | 5/2007 | Lyons |

FOREIGN PATENT DOCUMENTS

| | | |
|---|---|---|
| EP | 0035550 B1 | 11/1985 |
| EP | 0737289 B1 | 9/2004 |

OTHER PUBLICATIONS

Chimney Fans by ENERVEX—Venting Design Solutions. www.chimneyfans.com.

* cited by examiner

*Primary Examiner* — Charles Freay
*Assistant Examiner* — Kenneth J Hansen

(57) ABSTRACT

Draft inducers (50,40) having hollow axis (73a,73b), folding impellers (37a) or retractable propellers (37b) having limited presence in the flue path, external motor (47a, 47b) with sensors (33a, 33b), male connection (63a, 63b) and female connection (65a, 65b) ends for connecting with flue stack and other tandem modules.

6 Claims, 13 Drawing Sheets

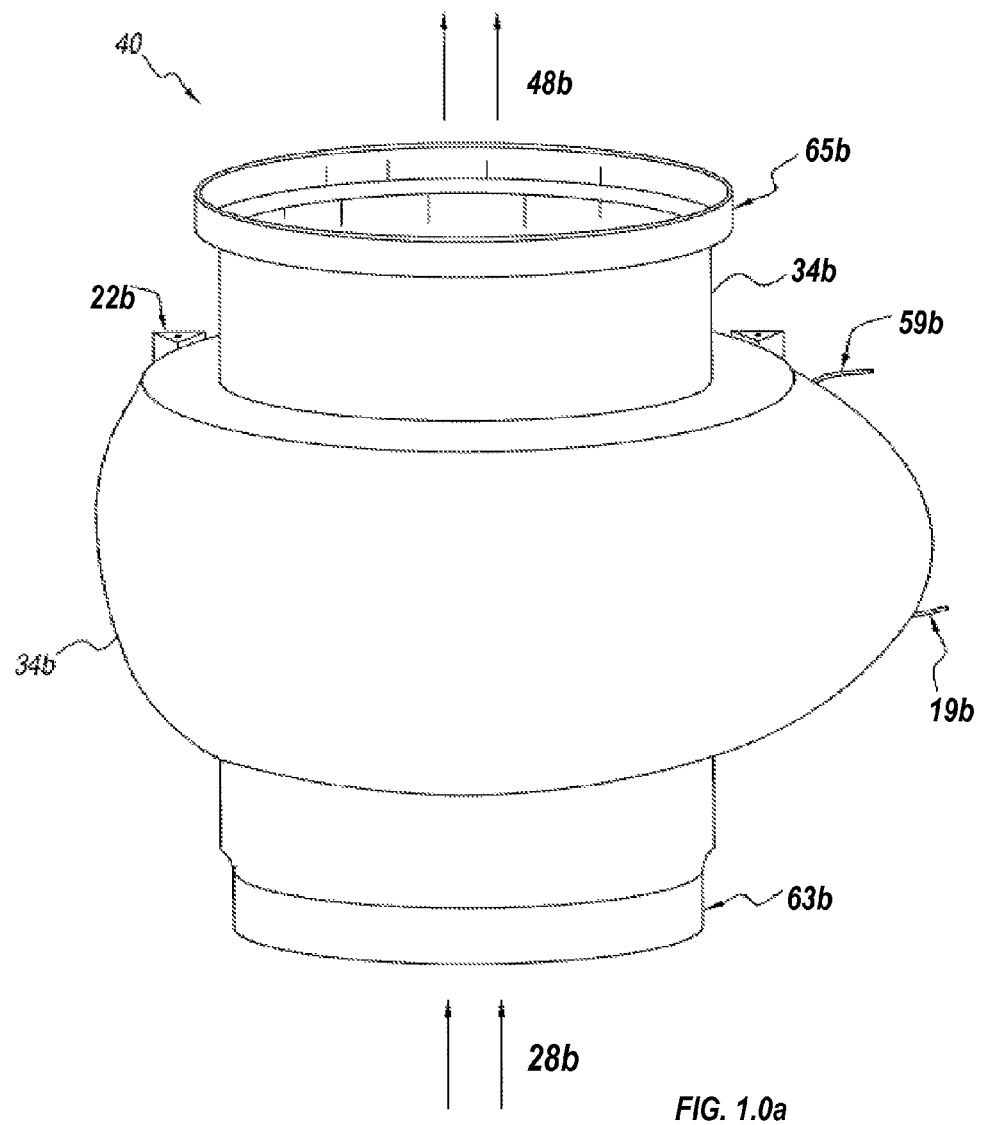
FIG. 1.0a

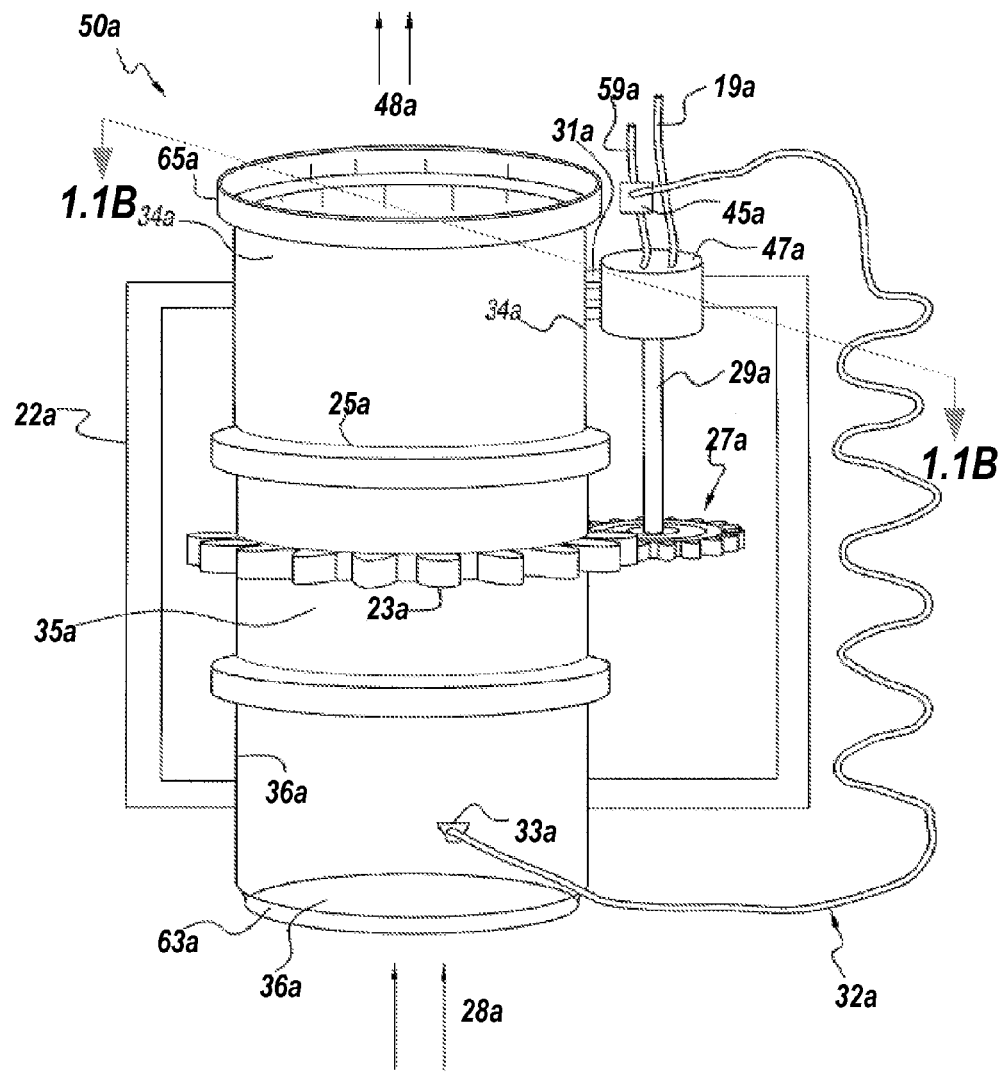
FIG. 1.1a

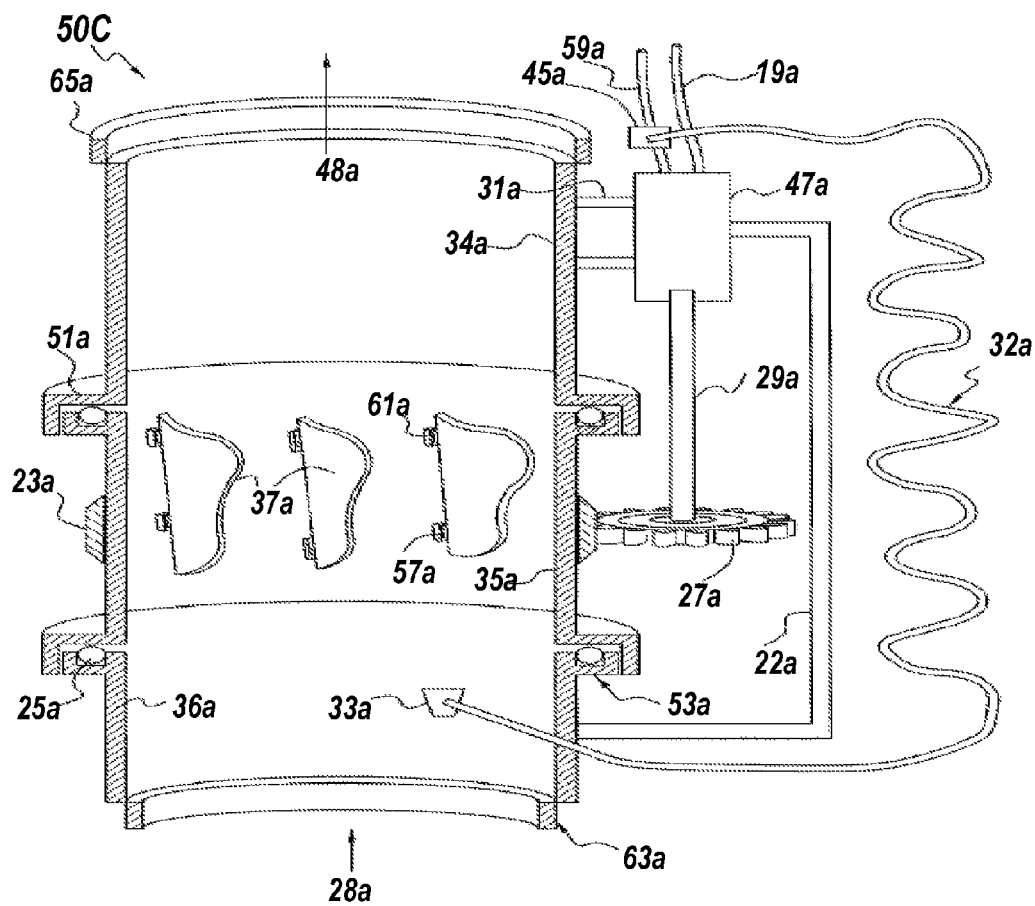
FIG. 1.1b

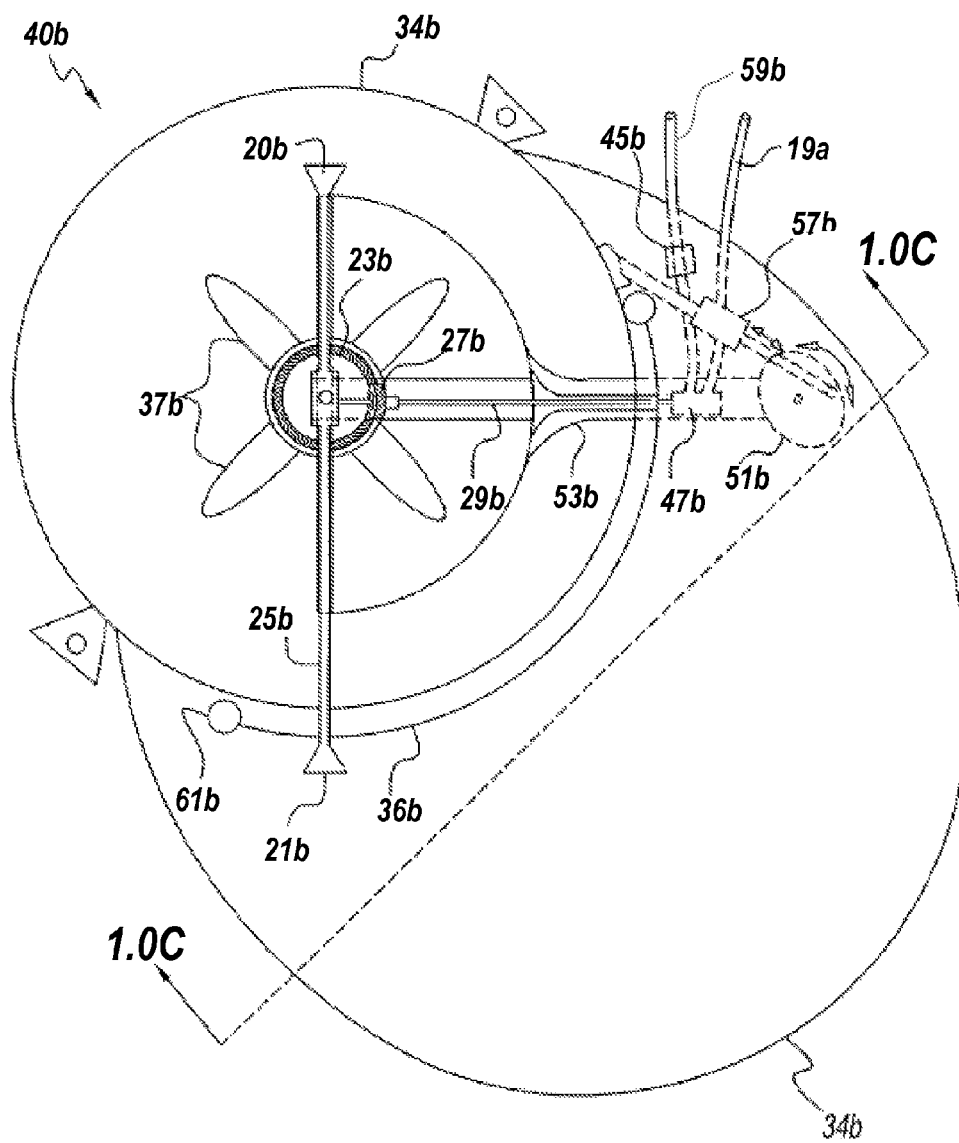
FIG. 1.0b

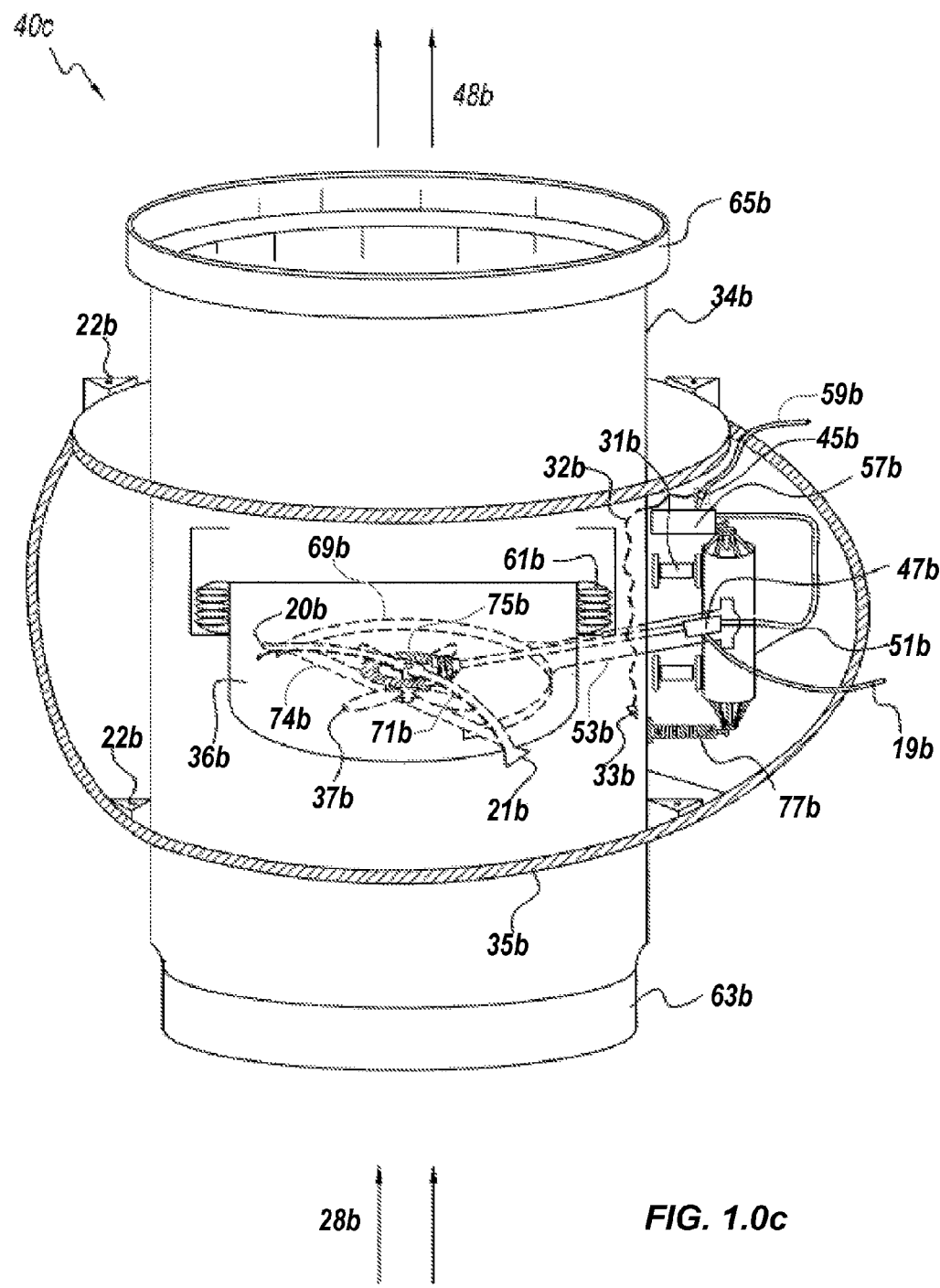
FIG. 1.0c

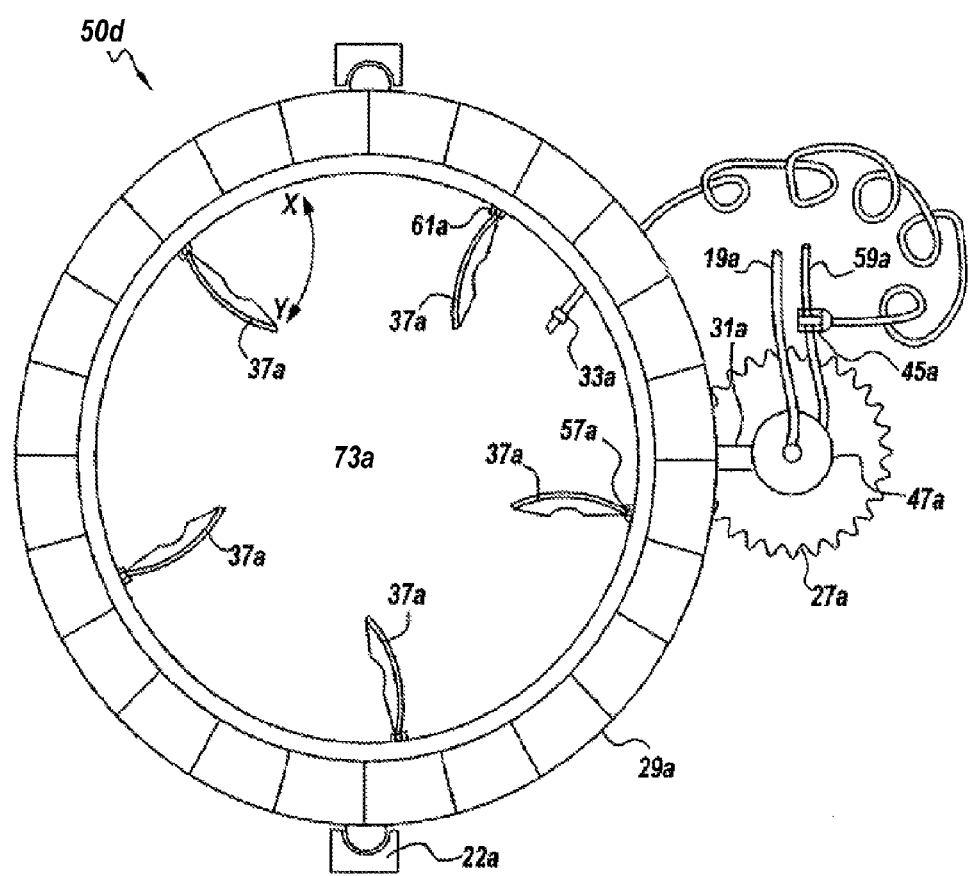
FIG. 1.1c

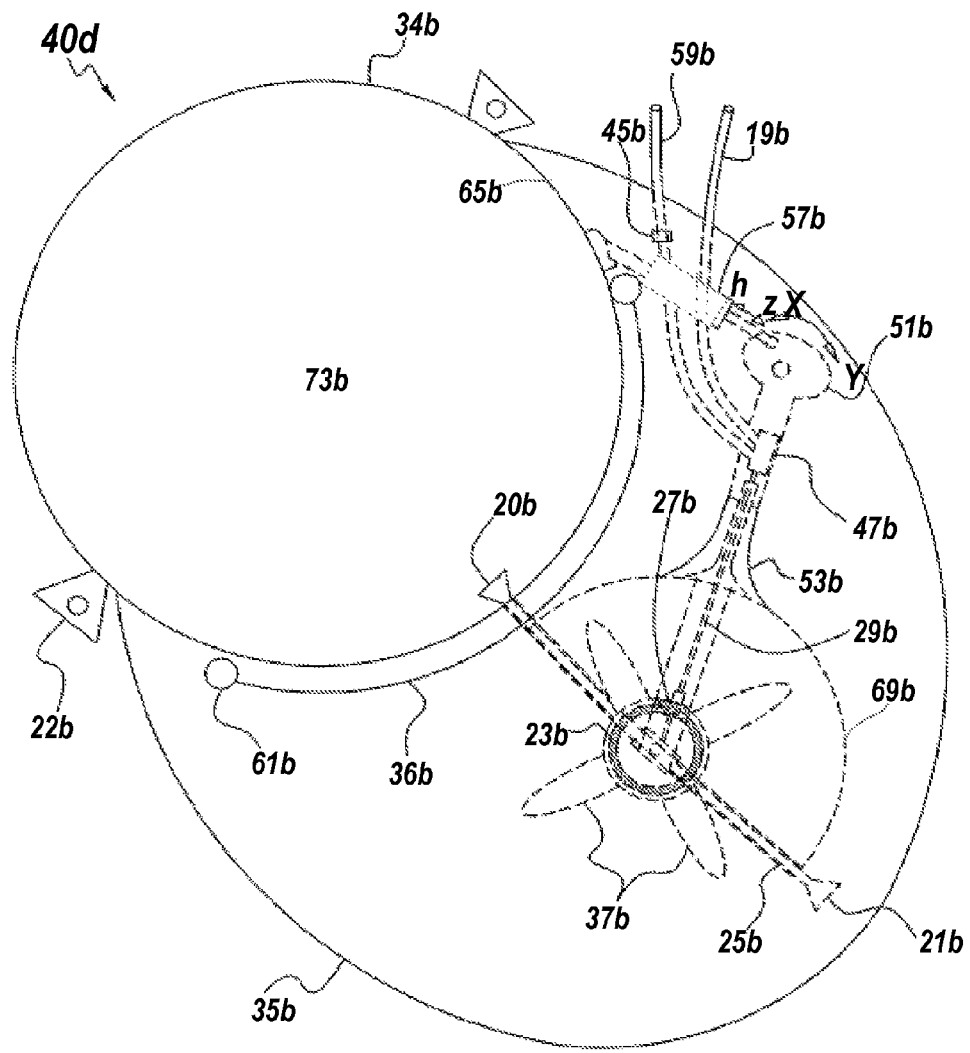
FIG. 1.0d

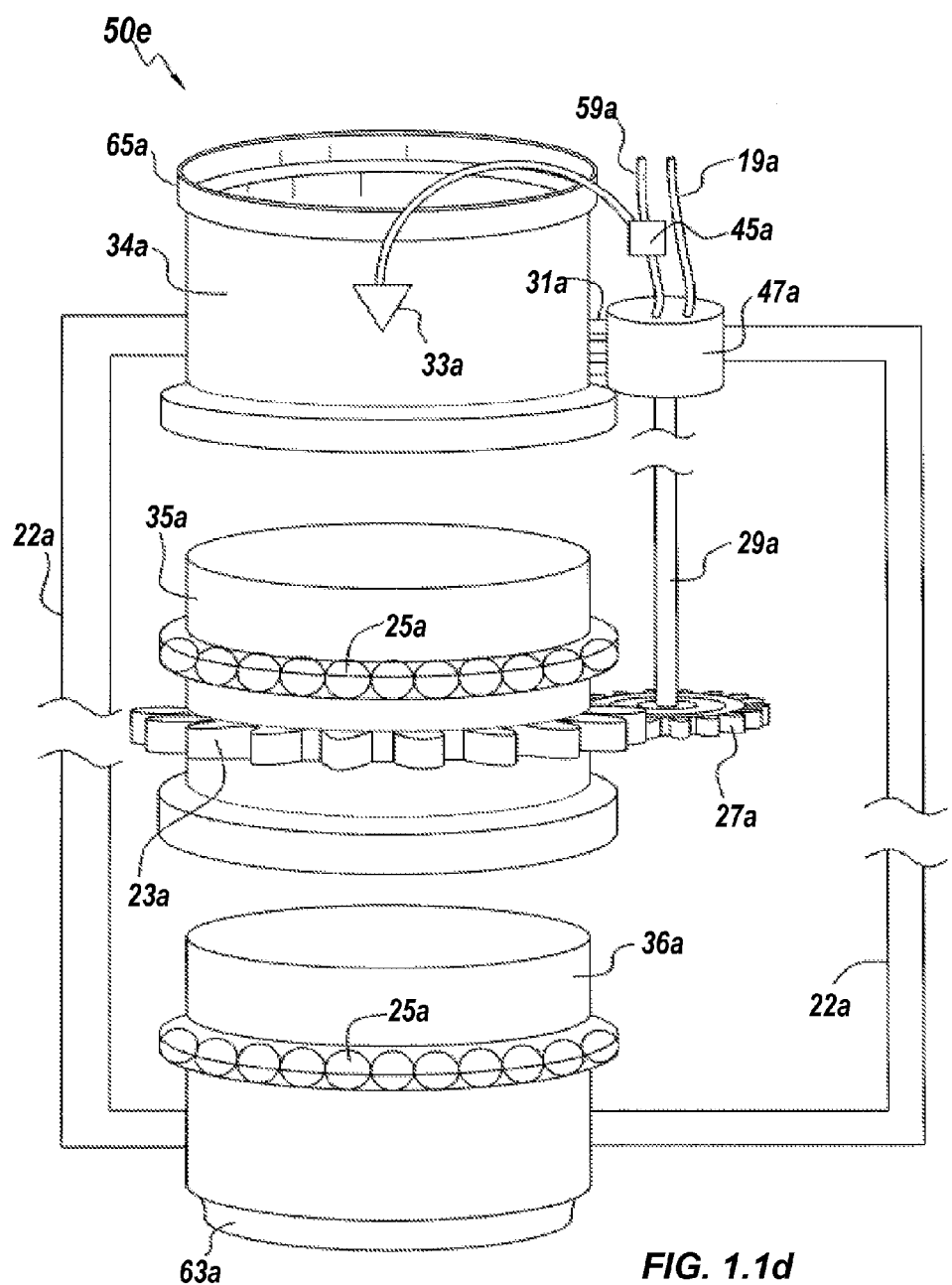
FIG. 1.1d

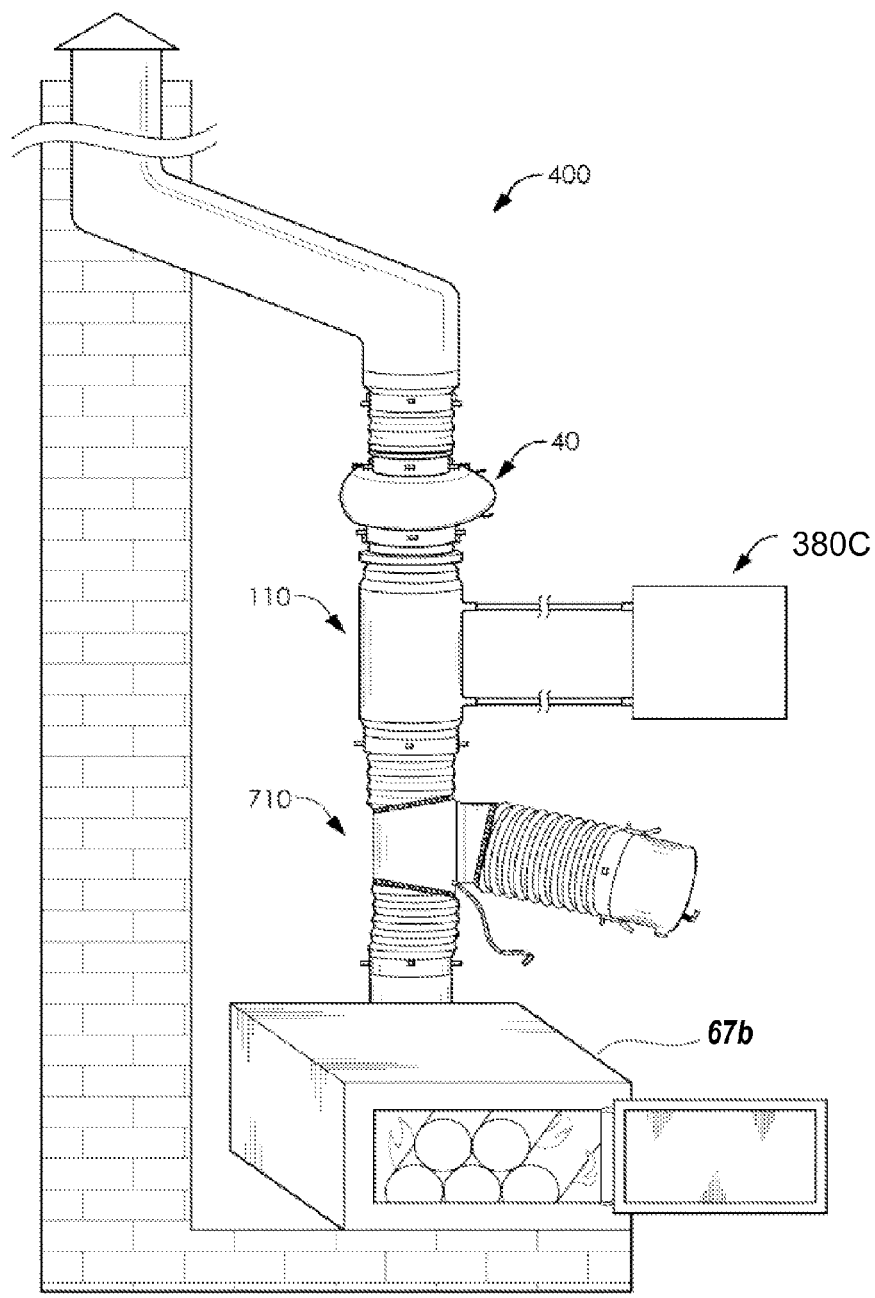
Fig. 2.0a

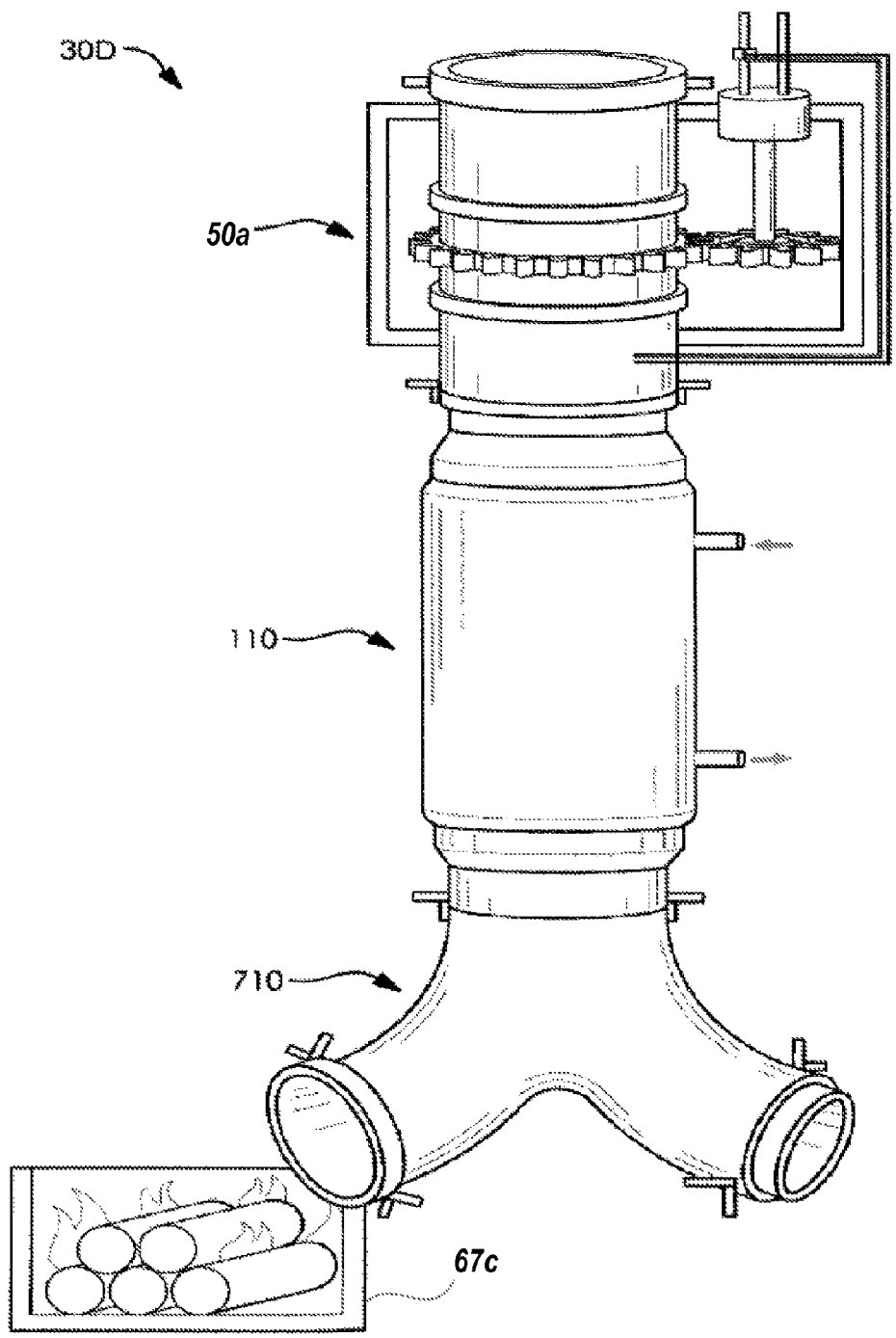
Fig. 2.1a

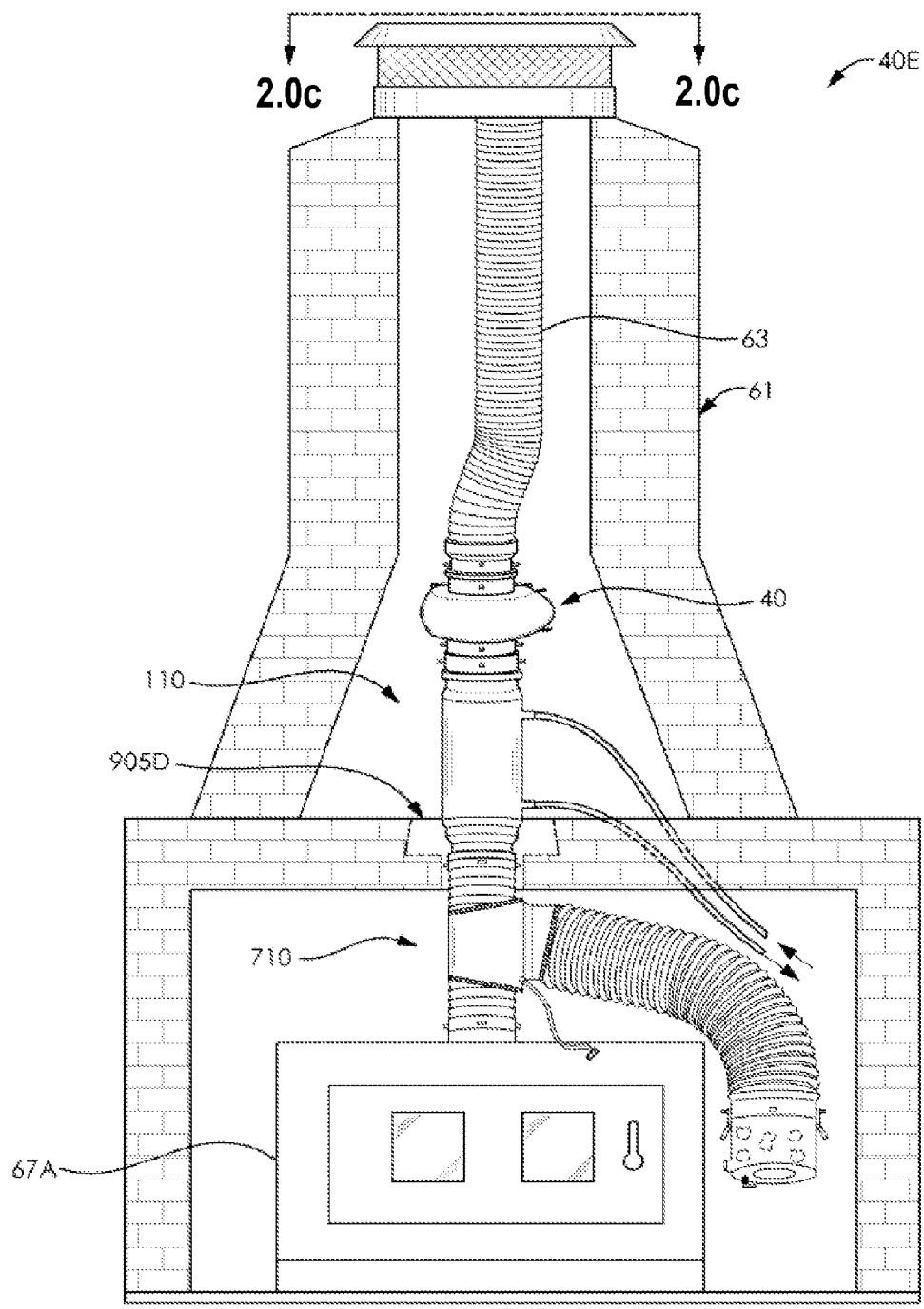
*Fig. 2.0b*

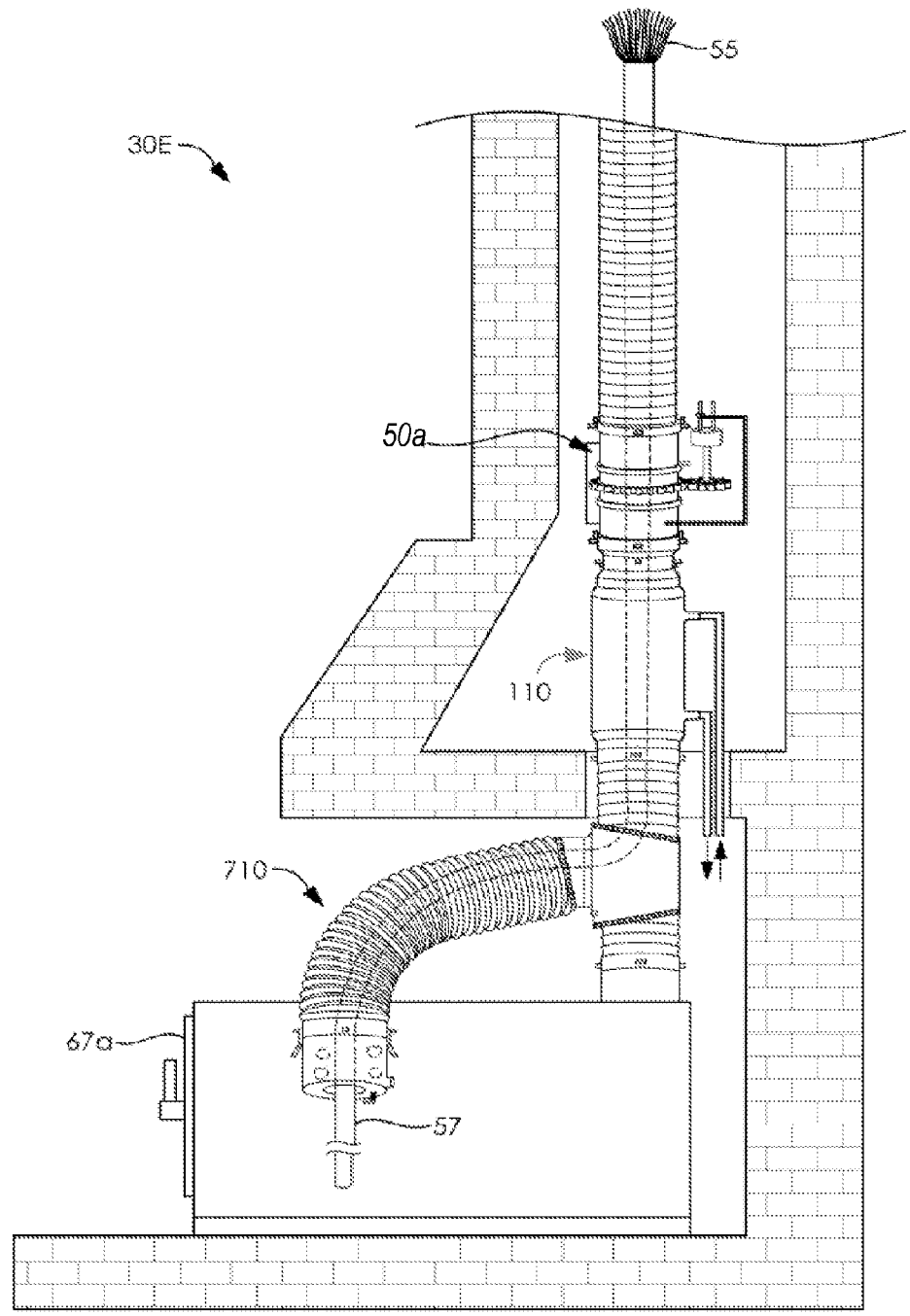
Fig. 2.1b

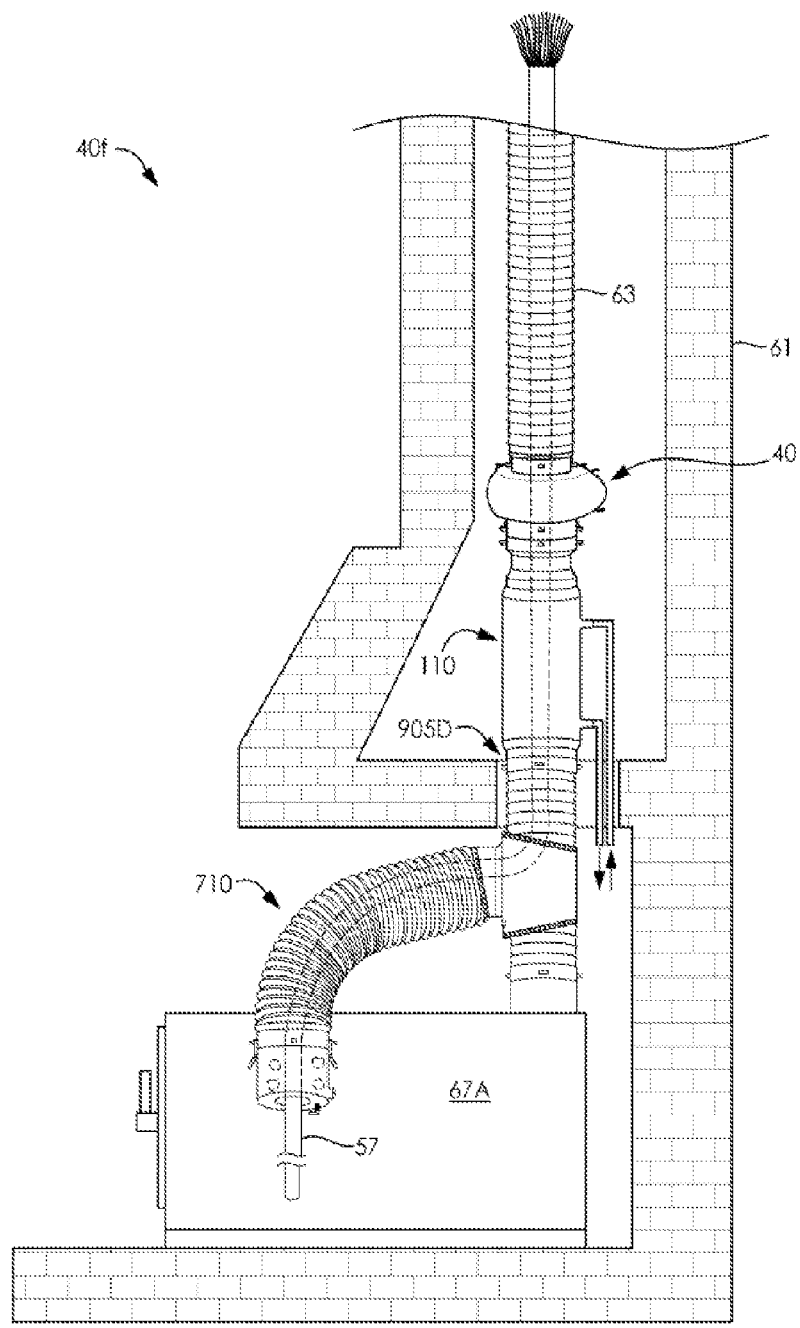
Fig. 2.0c

HOLLOW DRAFT INDUCERS (DRAFT INDUCERS OR HOLLOW INDUCERS)

CROSS REFERENCES TO RELATED APPLICATIONS

This application claims priority from and benefit of provisional patent application Ser. No. 61/665,847 titled "Hollow Inducers (Inducer, Hollow Draft Inducers)" filed Jun. 28, 2012, which is incorporated here by reference in its entirety.

This application claims priority from and benefit of patent application Ser. No. 13/731,096 titled "Hollow Axial, Helical Cyclonic Channels for Maximum Heat Recovery and Environmental Smoke Condenser (Heat Reclaimer Smoke Condenser)" filed Dec. 30, 2012, which is hereby incorporated in its entirety by reference.

This application claims priority from and benefit of patent application Ser. No. 13/728,051 titled "Flexible Universal Flue Pipe Connector with Damper and Sweep Access" filed Dec. 27, 2012, which is hereby incorporated in its entirety by reference.

FEDERALLY SPONSORED RESEARCH

None

SEQUENCE LISTING

None

BACKGROUND OF INVENTION

This invention relates to modular hollow inducer and use to control flue draft for solid fuel combustion and heat recovery. It relates in particular to inducing, augmenting, varying flue draft rate in response to combustion need of oxygen, heat extraction, and environmental pollutant treatment. This invention further relates to a thermostatic speed controlled air intake and exhaust that gives optimum heat recovery, environmental and combustion management In combustion, there are the reactants and the resulting products or byproducts. The fundamentals of sustaining combustion are in the continuous supply of essential reactants and the removal of inhibiting, undesirable byproducts. On the supply side, one reactant, oxygen has no substitute. On the product side is desirable heat energy that is intertwined in the matrix of carbon dioxide, water and all other products that are combustion quenching and hazardous to life.

When there is a spike in the cost of fossil fuel, particularly petroleum, other alternative energy such as wood burning, experience a spike in demand. Many of the demands result in impromptu purchase and improper installation of wood energy devices and appliances. Some of such purchases and installations are inserting stove in a fireplace without a firebox sized flue pipe. It is a violation of the National Fire Protection Association (NFPA) design code spec and Chimney Safety Institute of American (CSIA) teaching. Basically, there is a flue size for a firebox dimension to assure operational safety and function relating to draft. Many draft inducer system designs have been presented with some varying attributes.

PRIOR ART

The following are some prior art that may be relevant:

U.S. Patent Documents:

| | | | |
|---|---|---|---|
| 1,151,611 | August 1915 | Prat | ... |
| 2,407,590 | January 1943 | Vineberg | ... 126/140 |
| 3,280,774 | December 1965 | English | ... 110/162 |
| 3,431,056 | March 1969 | Winegardner | ... 431/20 |
| 3,782,303 | January 1974 | Pfister et al | ... 110/162 |
| 3,788,795 | January 1974 | Zeitlin | ... 431/13 |
| 4,250,868 | February 1981 | Frye | ... 126/121 |
| 4,649,808 | March 1987 | Ward et al | ... 98/59 |
| 5,609,522 | March 1997 | Szwartz | ... 454/7 |
| 5,868,615 | February 1999 | Page | ... 454/36 |
| 6,223,740 B1 | May 2001 | Kim et al | ... 126/110 R |
| 6,382,203 B1 | May 2002 | Kim et al | ... 126/110 R |
| 7,210,903 B2 | May 2007 | Lyons | ... 415/204 |
| 7,278,832 B1 | October 2009 | Platz | ... 415/204 |
| 7,325,541 | February 2008 | Marcakis | ... 126/77 |
| 7,373,937 | May 2008 | Little et al | ... 126/286 |

U.S. Patent Application Publications:

| | | | |
|---|---|---|---|
| 2002/0014234 A1 | February 2002 | McCarren | ... 126/516 |
| 2005/0048427 A1 | March 2005 | Brown | ... 431/116 |
| 2005/0255417 A1 | November 2005 | Brown et al | ... 431/18 |
| 2005/0272989 A1 | December 2005 | Brown et al | ... 431/147 |

Foreign Patent Documents:

| | | | |
|---|---|---|---|
| EP 0737289 B1 | Sep. 8, 2004 | Gaius D. Kazen | ... F23M9/00 |
| EP 0035550 B1 | Nov. 21, 1985 | Richard C. Hill | ... F24H1/22 |

Nonpatent Literature Documents:

How Chimneys Work, http://www.woodheat.org/how-chimneys-work.html by Woodheat.org IntlliDraft™—for Fireplace Safety and Energy Saving, How It Works, Chimney Fan RS 009-016 Product Information by ENERVEX—Venting Design Solutions. WWW.Chimneyfans.com.

Successful Chimney Sweeping, Chapter 11, Sections 11.4-11.6, Prepared by Chimney Safety Institute of America et al, Sixth Edition, January 2002.

NFPA 211 Standard for Chimney, Fireplaces, Vents and Solid Fuel-Burning Appliances, 2006 Edition, Chapter 9, Section 9.11 by National Fire Protection Association.

A General Routine for Analysis of Stack Effect (July 1991) by John H. Klote, General Service Administration, Fire Protection Engineering Branch, Washington, D.C. 20405. http://fire.nist.gov/bfrlpubs/fire91/PDF/f91013.pdf English, in U.S. Pat. No. 3,289,774 presented a burner and a draft inducer to make efficient combustion by providing stoichiometric ratio of combustion reactants and avoid undesirable excessive smoke and soot byproduct. This art recognized that natural draft, inlet draft controls, damper draft controls, and the combination of any of them is not very effective if the control results in poor combustion soot. It provides a positive inducer that correlates with the flow rate of fuel. However, the inducer comes with a 90 degree angle turn in flue pipe flow direction. The change in direction of flue pipe makes it easy for solid fuel flue carrying creosote to deposit it there and create difficulty to sweep it through that bend. Therefore, it is mainly useful for non-solid fuel combustion appliances. It regulates liquid or gaseous fuel and combustion efficiency. There is need for a draft inducer that can function with solid fuel as well as liquid and gas fuel combustion.

Marcakis in U.S. Pat. No. 7,325,541 discloses bimetal that expands or contracts due to temperature effect on its length to controls the air opening for a wood burning appliance. There is no active air moving component to forcefully control and effect draft, making it a passive draft inducer. Zeitlin in U.S.

Pat. No. 3,788,795 introduced the use of two photoelectric dictators to regulate electric motor which rotates a damper for a boiler flue draft. The relevance of this invention is the use of draft regulation to minimize flue energy loss. Szwartz in U.S. Pat. No. 5,609,522 presented a combination damper and chimney cap apparatus for draft control ability through remote sensor. The sensor and transmitter are located by the firebox. The receiver and the draft damper cap are located at the top of the chimney. Ward et al in U.S. Pat. No. 4,649,808 disclosed a fireplace damper assembly installed downstream of a fireplace at the top of the chimney having smoke or temperature activated electrically actuated damper, a draft assist fan and a wind protection hood. Little et al, U.S. Pat. No. 7,373,937 B2 disclosed a system with actuators and plates to control draft. It optimizes the combustion efficiency of an air-tight heating system. The draft control system and method in U.S. Pat. No. 7,373,937 B2 is specific to an appliance and localized to the enclosed firebox and combustion efficiency but nothing for heat recovery and environmental management. Like Marcakis, Zeitlin, Szwartz, Ward et al these draft controls are either located atop the chimney, controls an air aperture and or has no active flue movement or blower. A better draft control need not be located at the highest height and would serve better with active air moving blower.

Pfister et al in U.S. Pat. No. 3,782,303 describes an inducer consisting of propeller in the flue stream connected and driven by a shaft from an electric motor that is insulated from the flue gas and heat. Its intended benefit is in resolving smoky fireplace, inadequate air supply, and insufficient chimney height. The draft inducer has the advantages of insulated motor and has draft induction for multiple flues. However, to serve multiple flues, it must remain on constantly and that means a costly exhausting air from heated living space. It is installed at the top of the chimney, making hard to reach for service in the event of a breakdown. Further, the stack is not usable in the event of a breakdown since the draft inducer will become a blockage. There is need for better failure mode effect result in a draft inducer design consideration.

In U.S. Pat. No. 4,250,868, Frye presented the flue draft inducer that is installed at the top of the chimney with a chimney cap and designed to control heat exchange and temperature with variable speed control switch. Frye described draft as one of the most important factors affecting combustion efficiency in fireplace and solid fuel appliances. Frye's draft inducer is electrical and mounted on the top of a hot flue path. If used for solid fuel, cleaning the inducer and the chimney has a degree of difficulty due to the fixed, non-retractable inducer and heat exchanger. Like Pfister et al, the degree of difficulty is magnified by the peak height location of the inducer and blockage of natural draft in failure mode. There is need for draft inducer durability design with the motor located outside the flue stream and flue heat.

Emile Prat in U.S. Pat. No. 1,151,611 describes a steam powered, pressure and vacuum modulated draft inducing fan for boilers. The apparatus would provide adequate draft control with the benefit of safe conduction of combustion byproducts from living space and some improved combustion efficiency. The device had no direct environmental and energy recovery function. Failure mode effect would render the boiler inoperable. There is need for a draft inducer that could operate synergistically with an energy recovery system with better failure mode effect.

Using physical science format from non-patent references above, the factors considered in design of the natural chimney draft flow (F) are cross-sectional area of the stack (A), the external air temperature (To), the temperature inside the structure and chimney (Ti), the height of the chimney (H), the force of gravity (g), and the coefficient of discharge (Y). Except for (A), (g), (Y) and (H) the other factors (To) and (Ti) vary most by circumstance. Therefore, (F) depends most on (To) and (Ti). Draft through a stack (F) in a home increases as (Ti) increases over (To) and other factors remain constant. When (A) is changed, for example, by moving smaller firebox to a larger stack, or heat recovery apparatus deposits big layer of creosote in the stack walls, (F) is affected. (F) is also particularly affected when insert stove is installed inside an existing fireplace with larger stack area (A). The result can be deadly. There is need for a draft inducer to enforce draft when any of the constants like (A) has changed. There is the need for a draft inducer when Ti is decreased such as when heat is harvested from a combustion process.

The disadvantage with some prior arts is that they control an aperture size with passive flue movement of air. The active draft inducers in prior arts are electromechanical motors that are exposed to high temperature flue gas. The exposure of electrical equipments in a hot exhaust path has its risk of high failure rate due to heat effects on electrical conductors and appliances. Some prior art draft inducer systems are configured mostly for combustion and exhaust. Some of the prior art systems must constantly remain in operation. Many prior art draft inducer systems block cleaning access. Others draft inducers are located at the top of chimney where they are not easily removed for repair or service to the chimney. In the event of draft inducer malfunction, the inducer itself becomes an impediment to any natural draft that may exist and the combustion system suffers a total downtime. There is need for an inducer that does not take residence in the flue part, for draft inducer motor that will last longer and failure mode effect analysis will not be catastrophic or suffer total downtime.

SUMMARY OF THE INVENTION

In accordance with the present invention, the forgoing deficiencies can be remedied. One embodiment of the present invention, a hollow inducer comprises a hollow axis, modular connection, perimeter impeller with external motor, and sensor modulated speed control. In another embodiment, the hollow inducer comprises a central on-demand ejection propeller, hollow axis, modular connection, external motor, optical and or temperature modulated speed. Accordingly, the present invention provides a hollow inducer having multiple advantages including: a draft inducer that has its hollow axis, a motor outside the flue path saved from flue heat and short life span, means for shelving propulsion system that does not obstruct the flue path in a failure mode effect and sweep access, it can be positioned modularly in tandem with other flue treatment modules to control the rate of combustion, that pushes flue gas out and pulls fresh air into the combustion, that senses and controls the combustion, regulates heat recovery module and makes it possible to use smaller firebox in a larger stack and vice versa. These and other advantages of one or more aspects of the hollow inducer will be readily and particularly apparent in light of the following representative illustrations and ensuing description.

BRIEF DESCRIPTION OF THE DRAWINGS

In the drawings, closely related figures have the same number but different alphabetic suffixes.

FIG. 1.0A illustrates a perspective view showing one embodiment of the propeller draft inducer.

FIG. 1.1A illustrates a perspective view showing another embodiment of the impeller draft inducer.

FIG. 1.1B is a cross-sectional portion of FIG. 1.1A showing impeller draft inducer with impellers folded in dormant position in its hollow flue pipe.

FIG. 1.0B is a top view of FIG. 1.0A showing propeller draft inducer with propellers inserted in its flue pipe.

FIG. 1.0C is a cross-sectional side view of FIG. 1.0A showing propeller draft inducer with propellers inserted in its flue pipe.

FIG. 1.1C is a top view of FIG. 1.1A showing draft inducer impellers spread out in operating position (Y) in its flue pipe.

FIG. 1.0D is a top view of FIG. 1.0A showing propeller draft inducer with propellers ejected out of its flue pipe.

FIG. 1.1D is a general view of the impeller draft inducer illustrating the disconnected components prior to complete assembling.

FIG. 2.0a illustrates the application of propeller draft inducer in tandem with other energy, access and circulation modules on a Standalone appliance FIG. 2.1a shows the application of impeller draft inducer in tandem with other energy and sweep access modules with any incinerator.

FIG. 2.0b is showing the application of propeller draft inducer in tandem with other energy and sweep access modules with an insert appliance in an existing chimney.

FIG. 2.0c is a side cross-section view of FIG. 2.0b showing the application of propeller draft inducer in tandem with other energy and sweep access modules on an insert appliance in an existing chimney.

FIG. 2.1b is a side cross-section view of FIG. 2.0b showing the application substitution of the propeller draft inducer with the impeller draft inducer in tandem with other energy and sweep access modules on an insert appliance in an existing chimney.

DRAWINGS—REFERENCE NUMERALS

40 Embodiment of FIG. 1.0A Draft Propeller & Controller 19a hot fluid outlet
19b hot fluid outlet
20b inside stopper
22a mounting connector
22b mounting flange
21b outside stopper
23a impeller gear
23b propeller gear
25a ball bearings
25b window opener
27a shaft gear
27b shaft gear
28a flue inlet
28b flue inlet
29a drive shaft
29b drive shaft
31a beam support
31b beam support
32a sensor link
32b sensor link
33a sensors
33b sensors
34a upper casing
34b inner casing
35a impeller casing
35b propeller casing
36a lower casing
36b window
37a impeller elements
37b propellers
45a power controller
45b power controller
46a optical sensor
46b optical sensor
47a motor
47b motor
48a flue outlet
48b flue outlet
51a top bearing cover
51b propeller beam
53a lower bearing cover
53b propeller Arm
57a mounting hinges
57b Insertion actuator
59a power and fluid inlet
59b power and fluid inlet
61a wedge
61b sash recoil spring
61 chimney brick wall
63a male connection
63b male connection
63 flue pipe
65a female connection
65b female connection
67a insert Stove
67b general combustor/Incinerator
67c Standalone stove
40 propeller hollow inducer
50 impeller hollow inducer
69b semi-circular structure
71b bow limp
73b lowers bar
73a hollow axis
73b hollow axis
75b axle rod
77b ejection recoil spring
110 heat extractor, like the Heat Reclaimer Smoke Condenser. This reference numeral claims the benefit of provisional patent application No. 61/612,314 filed Mar. 18, 2012 by the present inventor, titled Hollow Axial, Helical Cyclonic Channels for Maximum Heat Recovery and Environmental Smoke Condenser (Heat Reclaimer Smoke Condenser).
380C heat ejector
710 connector, like the Flexible Universal Connector (This reference numeral claims the benefit of provisional patent application No. 61/589,813 filed Jan. 23, 2012 by the present inventor, titled Flexible Universal Flue Pipe Connector with Damper and Sweep Access).
905D damper hole sealer, like Ventinox® Connector seal kit

DETAILED DESCRIPTION OF THE EMBODIMENTS

Construction

FIGS. 1.1A, 1.1B, 1.1C, 1.1D

One embodiment of an impeller hollow inducer is illustrated in FIG. 1.1A (side view) and FIG. 1.1B (crossed-section view), generally designated as 50 and 50C respectively. The impeller hollow inducer has hollow axis and cylindrical body with flue inlet 28a and outlet 48a. The flue inlet 28a and flue outlet 48a terminates in male connection 63a and female connection 65a respectively. The draft inducer body is made of refractive materials such as 0.015" minimum thick stainless steel or 0.005" minimum thick titanium, has an upper casing 34a detachably connected to a impeller casing 35a which is detachably connected to a lower casing 36a. As illustrated in the FIG. 1.1D, the upper casing 34a and the impeller casing 35a are provided with an upper bearing cover 53a and the lower casing 36a and the impeller casing 35a are provided with a lower bearing cover 51a. The upper bearing covers 53a and lower bearing covers 51a enclose ball bearings 25a which fills the gaps that connects the three casings. The ball bearings 25a provide reduced friction for the rotation of the impeller casing 35a. Slant mounted impellers 37a are attached with hinges 57a to the inside surface of the impeller casing 35a.

In FIG. 1.1C (top view) impellers 37a are uniformed, having contoured shape and balanced spacing for efficient movement of air. Wedges 61a are attached to the mounting hinges 57a to determine the balanced operating position Y for the impellers 37a. During operation or clockwise rotation of the impeller casing 35a, the impellers 37a swings to Y location. The impeller 37a will fold to X dormant position when for example a sweep brush is inserted. In FIG. 1.1D (assembling view) a mounting connector 22a that holds the three casings together has been severed to expose the assembly. Beam supports 31a connect a motor 47a to the upper casing 34a. A power or fluid inlet 59a such as electric or hydraulic pumped fluid is connected to a power controller 45a and is connected to the motor 47a. At least one temperature and/or optical sensor 33a are connected to the power controller 45a via a sensor link 32a. The sensor link 32b and the sensor(s) 33b can be positioned at any desired location for controlling information input source. A drive shaft 29ba with its shaft gear 27a projects from the motor 47a and connects to the impeller gear 23a connected to the impeller casing 35a.

Alternate Embodiments

FIGS. 1.0A, 1.0B, 1.0C, 1.0D

Another embodiment of the draft inducer is illustrated in FIG. 1.0A (side view) and FIG. 1.0B (top view), generally designated as 40 and 40b respectively. The draft inducer body, made of refractive materials such as 0.015" minimum thick stainless steel or 0.005" minimum thick titanium, has an inner casing 34b detachably connected to a propeller casing 35b. The inner casing 34b is hollow with flue inlet 28b and outlet 48b. The flue inlet 28b and outlet 48b terminates in male connection 63b and female connection 65b respectively. A window 36b with sash recoil spring 61b is connected to an opening in the inner casing 34b leading into the propeller casing 45b as illustrated in FIG. 1.0C (cross-sectional side view). The propeller casing 45b encloses a propeller beam 51b connected to a beam support 31b attached to the inner casing 34b. The propeller beam 51b is rotated clockwise and counterclockwise by a beam actuator 57b and an ejection recoil spring 77b connected to the propeller beam 51b and the inner casing 34b. A power or fluid inlet 59b such as electric or hydraulic pumped fluid is connected to a power regulator 45b and is connected to the beam actuator 57b. At least one temperature and/or optical sensor 33b are connected to the power controller 45b via a sensor link 32b.

FIG. 1.0C shows the sensor link 32b and the sensor(s) 33b can be positioned at any desired location for controlling information input source. A hydraulic or electric motor 47b is mounted on a propeller arm 53b attached to the propeller beam 51b and projects out into a semi-circular structure 69b.

The semi-circular structure 69b terminates in a facedown bow-like structure with bowed limp 71b and lowers bar 74b. A propeller 37b with a propeller gear 23b is mounted between the bowed limp 71b and lowers bar 74b using an axle rod 75b. A drive shaft 29b from the motor 47b connects to the propeller gear 23b with its shaft gear 27b. At the opposite ends of the bow limp 71b are ejection stopper 20b and insertion stopper 21b hooks. FIG. 1.0B and FIG. 1.0C shows the propeller arm 53b and all its attachments in the flue path inner casing 34b with the insertion stopper 21b hook stopping further insertion. When power is supplied to the power or fluid inlet 59b, it passes through the power controller 45b to the actuator 57b. The actuator piston moves from h to z position causing the rotation of the propeller beam 51b from X to Y position. The power the reaches the motor 47b and exits from a return outlet 19b.

Operation

FIGS. 2.0a, 2.0b, 2.0c, 2.1a, 2.1b,

The manner of using the hollow draft inducer to maintain draft in a combustion flue stack is similar but relatively easier, durable and safer than using other prior art draft inducers currently in use. The hollow draft inducer could be used to replace existing draft inducers that do not have a hollow axis, support energy recovery, better failure mode analysis effect and other easy functionalities that come with the present invention.

The application of propeller hollow draft inducer 40 is shown in FIG. 2.0a generally designated as 400. It can be used in tandem with other systems such an access module 710, a circulation modules 380C, an energy recovery and environmental module 110 on a Standalone appliance 67b. In this application, the propeller hollow draft inducer 40 of FIG. 1.0C is connected to an energy recovery and environmental module 110 with it male connection 63b and to the flue pipe with its female connection 65b. When power is supplied to the power and fluid inlet 59b, the power modulator 45b acquires the condition of operation from the sensors 33b. This draft sensor 33b will mount anywhere in the path of the flue and with other flue gas treatment equipments in tandem. The temperature sensor 33b could be used by the power modulator 45b to vary the motor speed to the temperature of the flue. In this setup, when temperature is high, heat recovery capacity may have been exceeded and combustion need to slowdown for recovery module to catch-up. The optical sensor 33b could be set to be proportional to power increase. In this type of setup, when there is much smoke, propulsion will increase to expel the smoke and pull-in more air to make combustion robust.

The modulated power goes to the actuator 57b and to the motor 47b. The actuator turns the propeller beam 51b in clockwise direction. Simultaneously, the inside stopper/opener 20b lift the window 36b against the window sash recoil spring 61b and inserts the propeller arm 53b into the inner casing 34b flue path through the window 36b. As the window 36b closes behind the inserted propeller, the outside stopper/opener 21b stops the insertion process at the programmed position. The motor 47b rotates the drive shaft 29b with shaft gear 27b. The shaft gear rotates the propeller gear 23b which rotates the propeller 37b. The rotation of the propeller 37b provides the induced draft to expel the flue gas that lost its buoyancy thermal energy to energy recovery and environmental treatment module 110. In FIG. 1.0D, power fluid inlet 59b is terminated, the ejection recoil spring 77b returns the propeller arm back to the propeller casing 35b, leaving the inner casing 34b hollow for unobstructed sweep maintenance or usage with natural draft. FIG. 2.0b designated 40E, shows propeller hollow draft inducer 40 in tandem with energy recovery and environmental treatment module 110 and sweep access module 710 with an insert appliance in an existing chimney. FIG. 2.0c is showing a side view cross-section of FIG. 2.0b designated 40F, the propeller draft inducer 40 in tandem with energy recovery and environmental treatment module 110 and sweep access module 710 with an insert appliance in an existing chimney The impeller hollow draft inducer 50 application is illustrated in FIG. 2.1a, generally designated as 30D. It can be used directly in any general combustion/incinerator 67c process to provide better combustion by drawing oxygen rich air through the combustion while exhausting the flue gas. In another application, it is be use with an access module 710 to provide ambient air dilution of the heat from a flue gas. Such application is useful where the flue pipe material is susceptible to high temperature from the hot flue. The impeller hollow draft inducer 50 is equally functional in a tandem such as an access module 710, a circulation module 380C, an energy recovery and environmental module 110 on a general combustion/incinerator 67c process. In this application, the impeller hollow draft inducer 50 of FIG. 1.1 and FIG. 1.1C designated 50a and 50c respectively, is connected to an energy recovery and environmental module 110 with its male connection 63a and to the flue pipe with its female connection 65a. When power is supplied to the power and fluid inlet 59a, the power modulator 45a acquires the condition of operation from the sensors 33a. The modulated power goes to the motor 47a. The motor 47a rotates the drive shaft 29a with shaft gear 27a. The shaft gear rotates the impeller gear 23a which rotates the impeller casing 35a on the ball bearings between the upper casing 34a and the lower casing 36a. The initial rotation of the impeller casing 35a causes the impellers 37a to pivot on the mounting hinges 57a from say X until stopped at the right position Y by the wedges 61a. Continuous rotation of the impellers 37a provides the induced draft for the desired applications. When power fluid or electric inlet 59b terminates, the draft inducer 40 remains axially hollow 73a as in FIG. 1.1D for unobstructed sweep maintenance or usage with natural draft. When a sweep brush is inserted, the hollowness widens as the impellers are nudged from Y to X position. FIG. 2.1b is a side view cross-section of FIG. 2.0b designated 30E showing the substitution with the impeller inducer 50 for the propeller draft inducer 40 in tandem with energy recovery and environmental treatment module 110 and sweep access module 710 with an insert appliance in an existing chimney.

ADVANTAGES OF THE INVENTION

From the description above, a number of advantages of some embodiments of the present invention become evident:
1. Versatile: Provide a modular flue draft inducer for used on a chimney fireplace, stand alone or insert woodstove, coal or pellet stoves, gas fireplace, incinerators and the like. Provide a different kind of exhaust means that can be positioned with various stacks, fireplaces and equipment without obstructing and requiring disassembling before routine maintenance. It can portably be relocated and fits any stack and any location in the stack and can be positioned modularly in tandem with other modules.
2. Durable: The motor is located outside the flue path and never exposed to hot and corrosive flue stream. An electric or hydraulic motor is durable in this inducer since the motor is located outside the flue path and saved from flue heat and short life span
3. Safer: Creosote removal by sweeping is fundamental to chimney fire safety. Safety of any system depends on its serviceability which depends to a great extent on accessibility. Credit to the hollow axis and no obstruction, the stack can easily be swept through without disassembly of the stack systems. Disassembly and reassembly of a system is discouraging, costly and time consuming. The result is postponement which could end in catastrophe. The inducer presents this safer, see through and easy sweep through advantage.
4. Improves combustion: After combustible has been ignited, supply of oxygen and removal of carbon dioxide has to be maintained to sustain or improve the combustion. The inducer provides active draft system with temperature and sensor variable speed, making it possible for measured amounts of air to come into the combustion chamber or fire box. The result is a hotter flame that increases efficiency of combustion and pollution abatement. Therefore, it provides a draft system that smartly and actively enforces primary air and secondary air for wood stoves and fireplaces. Further, the hollow inducer provides first-in first-out flue stream in the smoke chamber and auto regulation of rate of exhaust based on temperature of the exhaust flue; that control the rate of combustion; that pushes flue gas out and pulls fresh air into the combustion. In one embodiment, the propeller auto temperature controlled speed, chokes the combustion at the initial start of fire in the firebox and modulates draft at later stage of the combustion to control heat extraction. As the temperature increases, the air intake decreases and vice-versa to optimize rate of combustion, heat recovery and environmental treatment.
5. Supports heat recovery and smoke condensing: With the invention of the connector (710) and the heat reclaimer smoke condenser (110), this inducer provides the control rate of the flue passage based on inputs from temperature sensor and/or the smoke sensor and/or the carbon monoxide sensor. In a setup, the inducer speed is directly proportional to smoke and toxic gas but inversely proportional to the temperature. When the flue gas is very hot, the inducer slows down the exhaust for the heat reclaimer to catch-up and combustion to slow down. When the flue gas is slow and produces excessive smoke or toxic gas, such as the beginning of the fire, the sensor responds by increasing speed of the inducer to increase combustion.
6. On-demand Presence: Presence of the impeller or propeller in the flue path is minimized or absent when the inducer is not in use. This implies that the stack is fully usable in its original form. This feature is particularly valuable when there is power outage or malfunction of the inducer. This inducer has better failure mode effect analysis because it is only present on-demand and not obstructive.
7. Minimize area ratio between firebox and stack: The variable and adjustable response of the hollow inducer provides draft flow that would also negate the rigid ratio relation of firebox to smoke chamber size and chimney effective diameter. The present inventions provide an advanced draft controller that broadens the line relating flue height above the roof and the nearest taller obstruction, the size of the firebox. The hollow inducer provides auto variable draft based on temperature and/or smoke which make flue pipe ratio to firebox a smaller factor in draft consideration.

CONCLUSION, RAMIFICATION, AND SCOPE

Accordingly, the reader will see that the hollow draft inducers of the various embodiments of the present invention can be used to control draft easily and conveniently; can be maintained without disassembly of the any part of the flue system setup; can easily connect in any location of the stack and with any other module in tandem; and can augment the draft of a small firebox in a bigger flue stack. In addition, by choice or when there is power outage, the flue stack can be operated in its original form since the hollow draft inducer maintains little or no permanent presence in the flue stack path. Furthermore, the hollow inducers have additional advantages in that:

They are relatively simple and easy to manufacture; installation can be performed without construction, sweep services can be done without scaling the chimney heights and no special tools and disassembly of the system is required.

They clearly have the advanced edge in failure mode effect analysis in that the flue stack can still be used in its original form, making the hollow draft inducer available on-demand.

They provide proportional push of flue gas and pull of fresh oxygen rich air into a combustion chamber using temperature, optical or carbon monoxide sensors.

Firebox to stack area ratio is no longer a rigid rule. And tandem equipments such as woodstoves and heat recovery smoke condenser have a controlling ally in efficiency performance.

The embodiments illustrated in this invention are in no way restricted to changes and modification that may be made without departing from the scope of this invention. Although the drawings and detailed descriptions above contain much specificity, those should not be construed as limiting the scope of the embodiments but as merely providing illustration of some of the embodiments. For example, the substitution of electric motor with hydraulic motor and impeller with propeller has been mentioned and demonstrated. Also, the hollow inducer could be used to prime a liquid flow in line with some adoptive modifications of the present invention. The embodiments are capable of numerous modifications, rearrangements, and substitutions of parts and elements without departing from the scope of the invention. Thus the scope of the embodiment should be determined by the appended claims and the legal equivalents, rather than the examples given.

What is claimed is:

1. A hollow draft inducer having an inlet and an outlet adapted for connecting to a flue stack, comprising:
    an upper cylindrical casing;
    a lower cylindrical casing;
    an impeller cylindrical casing, wherein each of the upper, lower and impeller cylindrical casings are formed of a refractive material;
    the upper cylindrical casing having the outlet with a female connection and a first top bearing cover;
    the upper cylindrical casing including an anchoring for an external motor with a drive shaft having a drive gear, the drive gear communicating with an impeller gear connected to an outside perimeter surface of the impeller cylindrical casing;
    an inner circumference surface of the impeller cylindrical casing having a plurality of impeller elements arranged around an inside perimeter of the inner circumference surface;
    wherein the impeller cylindrical casing is rotatably mounted between the upper and lower cylindrical casings and is driven by the drive shaft of the external motor;
    the impeller cylindrical casing having a first lower bearing cover with ball bearings in communication with the first to bearing cover of the upper cylindrical casing, and the impeller cylindrical casing having a second to bearing cover in communication with ball bearings in a second lower bearing cover of the lower cylindrical casing;
    the lower cylindrical casing having the inlet with a male connection and the second lower bearing cover with ball bearings in communication with the second to bearing cover of the impeller cylindrical casing.

2. The draft inducer according to claim 1, wherein the impeller elements are attached to the impeller cylindrical casing by hinges that allow folding and unfolding of the impeller elements, the hinges each having wedges that limit the unfolding of the impeller elements while holding the impeller elements in a balanced rotational position.

3. The draft inducer according to claim 1, wherein the impeller elements each have a curved surface mounted to angularly unfold and provide aerodynamic propulsion in one direction and to rotationally fold in an opposite direction.

4. The draft inducer according to claim 1, adapted to be available on-demand.

5. The draft inducer according to claim 1, having a controller adapted to provide a proportional volume of flue gas and to draw a corresponding proportional volume of fresh oxygen rich air into a combustion chamber using temperature, optical or carbon monoxide sensors.

6. The draft inducer according to claim 1, adapted for installation with a woodstove or heat recovery smoke condenser.

* * * * *